United States Patent [19]

Hall et al.

[11] Patent Number: 4,670,648
[45] Date of Patent: Jun. 2, 1987

[54] OMNIDIRECTIONAL VISION SYSTEM FOR CONTROLLNG MOBILE MACHINES

[75] Inventors: Ernest L. Hall; Mohammad Ehtashami, both of Cincinnati, Ohio

[73] Assignee: University of Cincinnati, Cincinnati, Ohio

[21] Appl. No.: 708,671

[22] Filed: Mar. 6, 1985

[51] Int. Cl.$^4$ .............................................. H04N 7/00
[52] U.S. Cl. ....................................... 250/216; 358/87
[58] Field of Search .............. 350/441; 244/3.16, 3.17; 356/1, 4; 250/216; 358/87

[56] References Cited

U.S. PATENT DOCUMENTS

| | | | |
|---|---|---|---|
| 3,278,752 | 10/1966 | Brixner | 358/87 |
| 3,780,224 | 12/1973 | Levine | 358/87 |
| 3,937,951 | 2/1976 | Krider | 250/216 |
| 4,520,973 | 6/1985 | Clark et al. | 244/3.16 |

*Primary Examiner*—Edward P. Westin
*Assistant Examiner*—Charles Wieland
*Attorney, Agent, or Firm*—Frost & Jacobs

[57] ABSTRACT

An optical sensor apparatus receives visible light and converts that light to electrical signals for use by a control system. Visible light enters the apparatus through a hemispherical "fisheye" lens which provides a 360° field of view in azimuth and a 180° field of view in elevation. The light exiting the fisheye lens is projected through a shutter mechanism onto a receptor of a camera. The lens, shutter mechanism, camera and a level dector are mounted on a gimbal mounting to maintain a vertical orientation of the lens and camera. When the optical sensor apparatus is called upon by the control system to provide visual information, the shutter mechanism is energized to open when the lens and camera next become vertical. Image processing is then performed to determine the position of the optical sensor apparatus relative to known landmarks in the operating environment.

8 Claims, 3 Drawing Figures

OMNIDIRECTIONAL VISION SYSTEM FOR CONTROLLNG MOBILE MACHINES

FIELD OF THE INVENTION

This invention pertains generally to vision controlled guidance systems and more particularly concerns an optical imaging assembly for controlling a mobile machine. The invention will be specifically disclosed in connection with an optical control assembly for recognizing obstacles in a field of movement and for guiding a vehicle around such obstacles.

BACKGROUND OF THE INVENTION

In general, machines capable of locomotion can be divided between those which require interactive control by a human operator and those which are self-controlling to some degree. With the rapid innovations of recent years in computer technology, interest and design activity has increased in the development of self-controlled mobile machines, often called robots.

It is axiomatic that before a control system of a self-controlled mobile machine can precisely guide the machine through an environment having obstacles, the control system must be capable of ascertaining the position and velocity of the machine relative to the obstacles. In other words, the system must be able to respond to features of the terrain and environment in which the machine operates.

One technique devised to provide such a capability is to limit movement of the machine to an established environment containing reference points which are easily detected by the control system. For example, a mobile machine can be constrained by control wires embedded in the operating terrain which provide signals as the machine approaches and thereby establish artificial boundaries which limit the range of possible motion of the mobile machine. Similarly, the machine may be designed to track a wire embedded in the operating environment. Such a device is disclosed in U.S. Pat. No. 4,180,964. Mobile machine systems operating on both of these methods are well-known and in widespread use today.

Other prior art control techniques do not require an established environment containing "live" reference points. Instead, they provide a sensing means by which the control system can ascertain the position of the mobile machine relative to one or more fixed passive reference objects which are recognizable to the control system. Several prior art researchers have accomplished this using a camera and standard target. The premise underlying this approach is that the position of the mobile machine can be calculated from the apparent dimensional and parallactic changes in a target of known dimensions and geometry caused by movement of the sensing means mounted to the machine. For example, one such system uses a diamond shaped mark which has its diagonals oriented horizontally and vertically. With this method, a camera lens mounted to the mobile machine is maintained at the same elevation as the mark with the optical axis of the camera pointed at the center of the mark. The location of the camera and mobile machine is determined by trigonometric computations which relate the apparent size and geometry of the received image to the actual size and geometry of the known target.

Another approach uses a mark (a sphere with vertical and horizontal circles) which will directly produce at least one of three positional parameters which relate the target location to the camera location (i.e. distance, elevation and azimuth angle). The geometry of this mark is such that the mark's shape remains unchanged when its center is viewed along the optical axis of the camera.

The prior art techniques described above have several limitations. The defined environment techniques require the installation of expensive, energy consuming beacons which require rotational scanning or the like. These techniques also may be limited by the physical terrain (e.g. corners or hills). The techniques using a reference mark require the receiving camera lens to remain focused on the mark at all times or to scan the environment. Furthermore, these techniques may require that the camera and reference mark remain at the same elevation. It is an object of the present invention to provide a sensory apparatus which avoids these limitations.

SUMMARY OF THE INVENTION

The present invention provides an optical sensor apparatus for use in an electronic control system of a mobile machine. The apparatus receives visible light and converts that visible light to electrical signals which can be interpreted by a control system to ascertain the location of the sensor apparatus and mobile machine. Visible light enters the apparatus through a hemispherical "fisheye" lens. The fisheye lens provides a 360° field of view in azimuth and a 180° field of view in elevation. Thus, the fisheye lens receives the entire hemisphere of images existing in the direction in which the fisheye lens is pointed.

The light departing from the exit side of the fisheye lens comprises a two dimensional representation of the hemisphere of images received by the entrance side of the fisheye lens. The light exiting the fisheye lens is projected upon a receptor of a solid state camera. If necessary, a conventional field lens can be interposed between the fisheye lens and the solid state camera to adjust the light beam diameter to match the camera receptor.

Interposed between the fisheye lens and the camera receptor is a shutter mechanism. The apparatus also provides a level detector. The fisheye lens, solid state camera, shutter mechanism, level indicator and, optional field lens all are mounted on a two degree of freedom gimbal mount. The gimbal mount maintains the camera assembly, including the fisheye lens, in a vertical orientation and the level indicator provides a signal indicative of such orientation. The shutter mechanism is provided to open only when the camera assembly is vertically oriented. In this manner proper orientation of the sensing apparatus is maintained and a blurred image is prevented.

The sensory apparatus operates as follows. Upon receiving a position update request from the control system computer, the gimbal positions are read by the level detector. When the optical axis of the fisheye lens is vertical, the shutter is opened and an image is received by the solid state camera and the image is digitized. Image processing is then performed to determine the position of the sensory device and mobile machine relative to recognizable, known reference landmarks in the environment in which the robot is operating.

DETAILED DESCRIPTION OF THE PREFERRED EMBODIMENT

The present invention is predicated to some degree upon the optical characteristics of a fisheye lens. As with all wide angle lenses, a fisheye lens bends light to capture a wide panorama of visual images. A fisheye lens is capable of producing a two dimensional image which captures all of the features of a wide panorama including a field of view or more. The image, however, may be very distorted from the actual appearance of the panorama. That is, the relative location of objects in the two dimensional image may be a quite different relationship among those objects.

Investigation of the distortion produced by a fisheye lens reveals two significant characteristics. These characteristics involve the relationship between the actual position of an object in space and the position of that object in an image produced by a fisheye lens.

Figure 1:
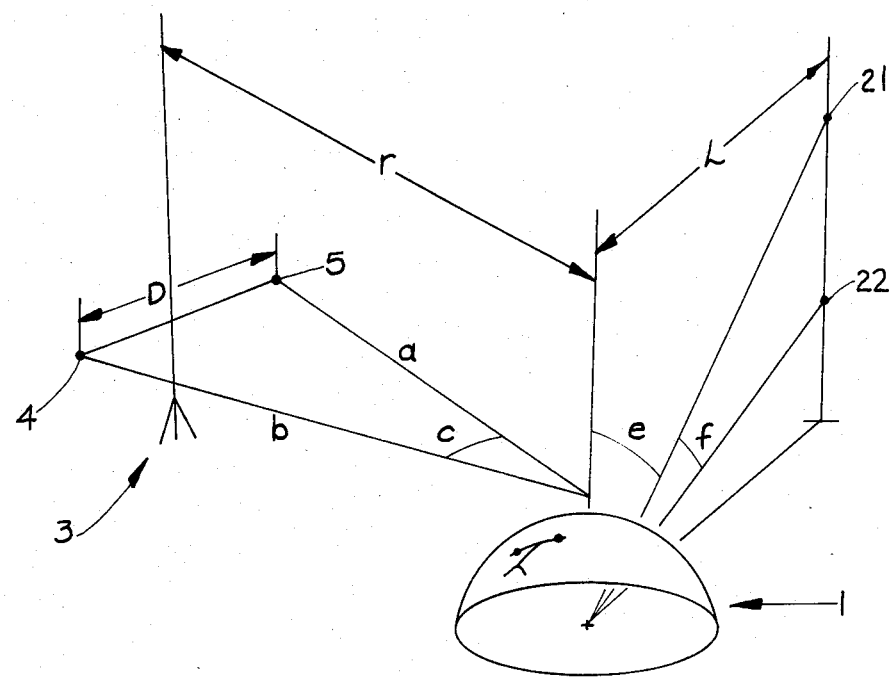
FIG. 1 illustrates diagrammatically the optical configuration asociated with the hemispherical lens of the vision system of the present invention.
Figure 1:
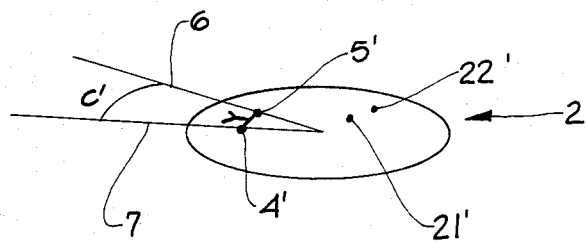

The first of these charactertistics involves the relationship between the elevation of an object at a fixed distance from the lens and the distance of the image produced by that object from the center of the resulting image field. The characteristic is illustrated in FIG. 1. The fisheye lens is shown generally at 1 with its optical axis vertical and the two dimensional image field produced by the lens is shown generally at 2. Reference objects 21 and 22 are shown at a distance L from the optical axis of lens 1. Object images 21' and 22' in the image field 2 are the products of reference objects 21 and 22, respectively. Given this configuration, careful observation reveals that there is a linear relationship between the zenith angle e of a reference object and the distance of that object's image from the center of the image field 2 where the zenith angle is defined as the angle between the optical axis and a line connecting the center of the lens base with the reference object. Stated differently, the difference in distance from the center of image field 2 between object image 21' and object image 22' is proportional to the zenith angle e resulting from the difference in elevation between object 21 and object 22.

The second significant distortion characteristic involves the relationship between the relative location of reference objects around the periphery of the lens and the relative positioning in the image field of the images produced by those reference objects. Again, the relationship is illustrated in FIG. 1. Shown generally at 3 is a reference target with reference objects 4 and 5. Light reflected or propagating from reference target 3 enters the fisheye lens 1 as part of the entire hemispherical scene received by the lens. The fisheye lens transforms that hemispherical scene onto a circular two dimensional image field 2. If the optical axis of the fisheye lens is maintained in a vertical orientation the image located at the precise center point of the circular image field 2 results from the objects located vertically above the fisheye lens.

The radial lines 6 and 7 projecting radially from the center point of image field 2 intersect the center of the image projections 4' and 5' produced by the reference objects 4 and 5. Given this arrangement, observation reveals that at a fixed distance r, the included angle c' between lines 6 and 7 always equals the included angle c between the lines a and b extending radially from the center of the fisheye lens and passing through the reference objects 4 and 5. At a fixed distance r, the included angle between lines 6 and 7 remains unchanged regardless of the elevation of the reference objects 4 and 5. These characteristics of a vertically mounted fisheye lens allow useful information to be derived from the two dimensional image produced by the lens. In particular, if the distance D is known, the distance r can be calculated based upon measurement of the included angle c' between lines 6 and 7. The following equations describe the position determination process.

$$\tan \frac{c}{2} = \frac{D/2}{r} \quad (1)$$

Another way of showing Equation (1) is $$\frac{2r}{D} = \frac{\cos c/2}{\sin c/2} \quad (2)$$

This may be rewritten as $$\frac{2r}{D} = \frac{2 \cos^2 c}{2 \sin \frac{c}{2} \cos \frac{c}{2}} \quad (3)$$

or $$\frac{2r}{D} = \frac{\cos^2 \frac{c}{2} + \cos^2 \frac{c}{2}}{\sin c} \quad (4)$$

Adding and subtracting the term $\sin^2 c/2$ gives $$\frac{2r}{D} = \frac{\cos^2 \frac{c}{2} + \sin^2 \frac{c}{2} + \cos^2 \frac{c}{2} - \sin^2 \frac{c}{2}}{\sin c} \quad (5)$$

Which may be simplified to $$\frac{2r}{D} = \frac{1 + \cos c}{\sin c}$$

This may be rewritten as $$\text{From (5), } r = \frac{D(1 + \cos c)}{2 \sin c} \quad (6)$$

From FIG. 1

$$a^2 = r^2 + \frac{D^2}{4} \quad (7)$$

$$a^2 = \frac{D^2}{4} + \frac{D^2(1 + \cos c)^2}{4 \sin^2 c} \quad (8)$$

Finally $$a^2 = \frac{D^2(2 + 2 \cos c)}{2(1 - \cos 2c)} \quad (9)$$

$$a^2 = \frac{D^2(1 + \cos c)}{(1 - \cos 2c)} \tag{10}$$

Equation 10 shows that the lens distance relative to the reference target 3 may be determined from the target width D and azimuth angle c. For example, if the target width D is 32 inches and the azimuth angle c is 3°, the lens distance, a, is 51 feet. For the same target width D and an angle c of 30°, the lens distance is about 5 feet. For the same target width D and an angle c of 1°, the lens distance is about 152 feet. In this manner, processing of the electrical signals derived from the field image 2 can be performed to determine the distance a between the center point of the fisheye lens and any recognizable reference object in the hemisphere of light received by the fisheye lens.

The present invention provides useful electrical signals to the control system of a mobile machine only when the optical axis of the fisheye lens and camera assembly is directed upward. When maintained in that position, the image projected by the fisheye lens onto the receptor surface of a camera can easily be used to determine the azimuth angle between lines extending radially from the optical axis and passing through any two reference objects in the environment surrounding the lens. That is, the azimuth angle associated with reference objects in the environment can readily be determined by the relative location of those object images in the image field projected by the fisheye lens onto the camera receptor regardless of the elevation of the reference objects. Therefore, if two recognizable reference objects are detected in the image field and the actual distance between these recognizable objects is known to the control system, then the location of the lens relative to those objects can be calculated.

Figure 2:
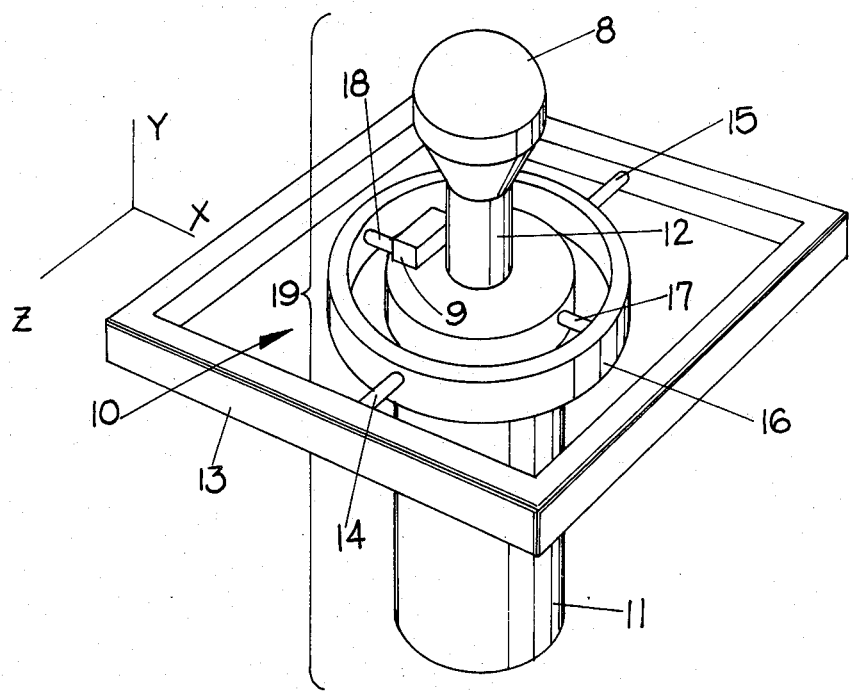
FIG. 2 is a perspective view of a preferred embodiment of the present invention.

The principles illustrated and described above are utilized by the apparatus illustrated in FIG. 2. FIG. 2 is an illustration of one embodiment of the sensor apparatus of the present invention. The apparatus consists of a fisheye lens 8, a level indicator 9, a two degree of freedom gimbal mount shown generally at 10, a solid state camera 11 and a reduction lens/shutter assembly 12.

As illustrated in FIG. 2, the entire camera assembly 19 and gimbal mount 10 is supported by a frame 13. Frame 13 may be of any design and construction. Attached to frame 13 are pivot rods 14 and 15. These rods are pivotally mounted to the frame 13 and allow the entire camera assembly 19 to pivot around a line parallel to the Z axis extending through pivot rods 14 and 15.

Pivot rods 14 and 15 are attached to harness 16 which carries pivot rods 17 and 18. Harness 16 may be of any shape; it need not be circular as shown. The pivot rods 17 and 18 connected to harness 16 are attached to the camera assembly 19 which comprises the fisheye lens 8, the reduction lens/shutter assembly 12, the level detector 9 and the solid state camera 11. Pivot rods 17 and 18 are connected to the camera assembly 19 at a point above the center of gravity of camera assembly 19 and thereby allow the camera assembly 19 to pivot around a line parallel to the X axis extending through pivot rods 17 and 18. In this manner, the frame 13 and the gimbal mounting 10 combine to allow the camera assembly 19 to remain at all times in an orientation which maintains the optical axis of the fisheye lens 8 vertical.

As previously stated, the camera assembly 19 consists of the fisheye lens 8, the reduction lens/shutter assembly 12, the level detector 9 and the solid state camera 11.

The fisheye lens 8 is rigidly mounted to the reduction lens/shutter assembly 12. The reduction lens/shutter assembly 12 contains a conventional shutter which is responsive to the level detector 9. The shutter is triggered to open and permit the projection of a visual image on the receptor of the solid state camera 11 only when the optical axis of the fisheye lens 8 is in a precisely vertical orientation. Reduction lens/shutter assembly 12 may also contain an optional reduction lens. The purpose of the conventional reduction lens is to adjust the size of the image projected by the fisheye lens 8 towards the camera 11 to match the size of the receptor field of the conventional solid state camera 11. Reduction lens/shutter assembly 12 is rigidly mounted to the solid state camera 11. Likewise, level detector 9 is rigidly attached to the camera assembly 19 at any convenient location. In this manner, the fisheye lens 8, level indicator 9, solid state camera 11 and reduction lens/shutter assembly 12 combine to provide a rigid camera assembly 19, all of which will move together as a unit in the gimbal mounting 10.

Figure 3:
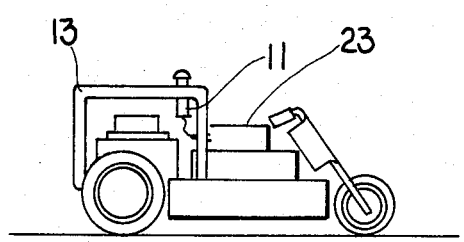
FIG. 3 is an elevational view of a lawnmower having a computer control system incorporating an optical sensor apparatus of the subject invention.

As a means to enable control of a robot, the present invention operates as follows. The frame 13 is affixed to a mobile machine such as a lawnmower as shown in FIG. 3. The mobile machine also includes a computer control system 23 which directs the motion of the machine. The computer control system 23 is programmed to execute a control logic. The control logic causes the drive mechanisms of the mobile machine to execute maneuvers which are dependant upon the location and movement of the machine in the operating environment at any given moment. For such control to occur, it is necessary that the control system 23 frequently reassess its position and velocity in the operating environment and determine whether the control logic requires a change in the operation of the drive mechanisms. The sensory input necessary for this frequent reassessment is provided by the present invention in the form of electrical signals produced by the solid state camera 11.

At predetermined intervals, the control system 23 signals the level detector 9 and the shutter mechanism contained within the reduction lens/shutter assembly 12 that it is prepared to receive electrical signals from the solid state camera 11. To operate effectively as a mobile robot in a live environment, these periodic requests for information would be quite frequent, occurring several times each second.

Upon receipt of such a signal, the level detector 9 assesses the orientation of the camera assembly 19. At the instant the camera assembly 19 is in a vertical orientation, level detector 9 signals the shutter mechanism to briefly open. At that instant, the solid state camera 11 receives an image which represents the hemisphere of objects located above and around the fisheye lens 8. As described above and illustrated in FIG. 1, the image projected upon the receptor of the solid state camera 11 would provide information useful to determine the location of the camera assembly 19 within its environment relative to known reference objects recognizable by the control system 23. The camera 11 produces electrical signals representative of the image field shown at 2 in FIG. 1. The electrical signals are processed by the control system 23 to evaluate the location of the mower in its environment at the moment the shutter was opened. The control system 27 compares this information with the known location of the mower at several prior instances when the position was evaluated. With this information, the control system calculates the approximate path being traversed by the robot and calculates the mower's instantaneous velocity along that path.

The information necessary for the control system 23 to execute this control logic would be supplied to the control system 23 by an operator using a training mode. During the training mode, the operator will direct the robot around the perimeter of the a field and indicate any critical obstacles using a conventional, radio controlled teach pendant. During the automatic mode, the robot will select and implement a mowing strategy. The sensors will permit responses to changes in the environment, such as avoiding obstacles, updating position, or responding to variations in terrain and avoiding any unforeseen obstacles.

Several mowing strategies may be followed. The strip strategy consists of translating the mower back and forth across the field oriented along the greatest length of the field. At the end of the field, a 180° rotation is executed to permit the next strip to the mode. The perimeter strategy consists of outlining the perimeter and mowing in every-decreasing areas until the field is mowed. A sector strategy consists of dividing the field into sectors and using either the strip or perimeter method for each sector. It is also possible to combine the strategies. For example, the operator could outline the perimeter of the field and major obstacles in the training mode, then let the computer sectorize the field, prioritize the sectors, then mow each using a strip pattern. With any of the strategies, obstacles can be avoided in two ways. In the training mode, the operator may indicate the location ot obstacles by directing the mower along the outer boundaries of the obstacles. This permits mowing around lakes or large flower beds. During the automatic mode, small obstacles such as trees can be automatically avoided using sonar techniques. This alleviates the need for the operator to locate a large number of small obstacles during training. In the automatic mode, contact sensors also would prevent the mower from getting stuck between obstacles such as large rocks or trees.

Combining the position and velocity information calculated by the control system 23 with the control system's memory of existing terrain obstacles and memory of a planned sequence of maneuvers, the control system 23 would direct the drive mechanisms of the mower to execute the appropriate procedures necessary tor it to operate within the environment.

While the invention is applicable to visible, optical radiation, the method and apparatus are also applicable to infrared, ultraviolet and other forms of electromagnetic radiation which may be imaged with an omnidirectional, wide angle lens.

What is claimed is:

1. An optical imaging assembly for use with a mobile machine guidance control system or the like comprising:
    a wide-angle lens having an optical axis and a substantially 360° field of view in azimuth for projecting images received from the surroundings;
    a means for producing electrical signals representative of said images projected by said lens;
    a pivotable gimbal for mounting said lens and signal producing means, said gimbal providing pivoting of said lens and signal producing means around two perpendicular pivot axes to thereby maintain said optical axis of said lens in vertical orientation in use;
    sensor means for detecting the orientation of said lens and signal producing means; and
    means responsive to said orientation detecting means for selectively sampling said representative electrical signals only when said optical axis is oriented vertically.

2. The imaging assembly according to claim 1 wherein said signal producing means comprises an electronic camera.

3. The optical imaging assmebly according to claim 1 wherein said wide angle lens comprises a hemispherical fisheye lens having a substantially 360° field of view in azimuth and a substantially 180° field of view in elevation.

4. The imaging assembly according to claim 3 wherein said signal producing means comprises an electronic camera.

5. An optical imaging assembly for use with a mobile machine guidance control system or the like comprising:
    a wide-angle lens having a substantially 360° field of view in azimuth for projecting images received from the surroundings;
    a means for producing electrical signals representative of said images projected by said lens;
    a pivotable gimbal for mounting said lens and signal producing means;
    sensor means for detecting the orientation of said lens and signal producing means; and
    means responsive to said orientation detecting means for selectively sampling said representative electrical signals, said selective sampling means comprising a shutter mechanism responsive to said orinetation detecting means and positioned between said lens and said signal producing means for allowing said projected images to reach said signal producing means only when predetermined conditions are satisfied.

6. The imaging assembly according to claim 5 wherein said signal producing means comprises an electronic camera.

7. An optical imaging assembly for use with a mobile machine guidance control system or the like comprising:
    a wide-angle hemispherical fisheye lens having a substantially 360° field of view in azimuth and a substantially 180° field of view in elevation for projecting images received from the surroundings;
    a means for producing electrical signals representative of said images projected by said lens;
    a pivotable gimbal for mounting said lens and signal producing means;
    sensor means for detecting the orientation of said lens and signal producing means; and
    means responsive to said orientation detecting means for selectively sampling said representative electrical signals, said selective sampling means comprising a shutter mechanism responsive to said orinetation detecting means and positioned between said lens and said signal producing means for allowing said projected images to reach said signal producing means only when predetermined conditions are satisfied.

8. The imaging assembly according to claim 7 wherein said signal producing means comprises an electronic camera.

* * * * *